United States Patent [19]

Gullotti et al.

[11] 4,286,744
[45] Sep. 1, 1981

[54] PROCESS FOR JOINING NARROW WIDTH THIN GAGE METAL OR ALLOY STRIP

[75] Inventors: Damian V. Gullotti, Cheshire; Lloyd E. Damon, Wallingford; Phillip A. Chatfield, West Haven; Joseph Winter, New Haven, all of Conn.

[73] Assignee: Olin Corporation, New Haven, Conn.

[21] Appl. No.: 96,464

[22] Filed: Nov. 21, 1979

[51] Int. Cl.³ .......................... B21D 31/02; B23K 1/04
[52] U.S. Cl. .................................... 228/125; 228/5.7; 228/155
[58] Field of Search ............... 228/103, 125, 126, 170, 228/5.7, 155

[56] References Cited

U.S. PATENT DOCUMENTS

| | | | |
|---|---|---|---|
| 870,847 | 11/1907 | Reitzel | 228/155 X |
| 2,761,208 | 9/1956 | Mitchell | 29/475 |
| 3,110,101 | 11/1963 | Kieffer et al. | 228/155 |
| 3,394,857 | 7/1908 | Wheeler et al. | 228/5.7 |
| 3,403,833 | 10/1968 | Wheeler et al. | 228/13 |
| 3,421,676 | 1/1969 | Jenkins | 228/5.7 |
| 3,771,215 | 11/1973 | Williams et al. | 29/482 |

FOREIGN PATENT DOCUMENTS

| | | | |
|---|---|---|---|
| 2725778 | 12/1977 | Fed. Rep. of Germany | 228/5.7 |
| 681115 | 10/1952 | United Kingdom | 228/155 |

OTHER PUBLICATIONS

Metals Handbook, 8th ed., vol. 6, pp. 686, 690.

Primary Examiner—Eugene F. Desmond
Attorney, Agent, or Firm—Victor A. DiPalma; Paul Weinstein

[57] ABSTRACT

A process is disclosed for joining narrow width thin gage metal or alloy strip end to end to form an elongated coil. The trailing end of a first strip segment and the leading end of a second strip segment are cut so as to match when placed in a butting relationship and to establish a joint between the strips. A preselected gap is established between the butting ends and a braze material is inserted in the gap. After heating to braze the strip segments together, the brazed joint is hammered to reduce the joint geometry to that of the parent metal strip segments.

7 Claims, 9 Drawing Figures

U.S. Patent  Sep. 1, 1981  Sheet 1 of 2  4,286,744
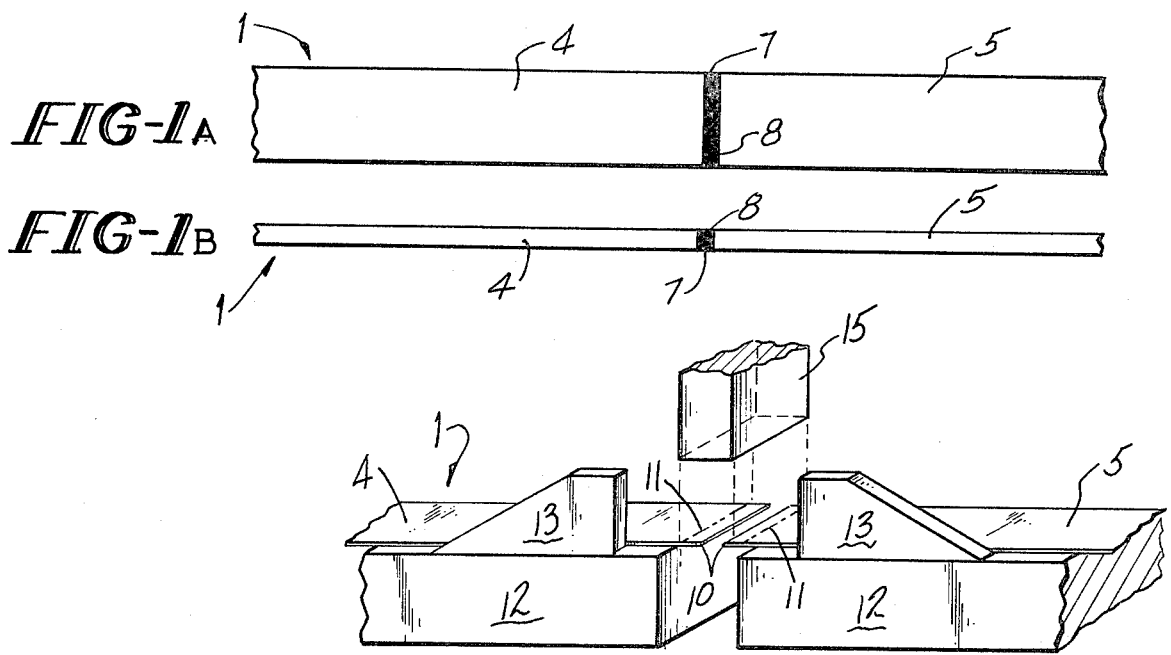
FIG-1A
FIG-1B
FIG-2
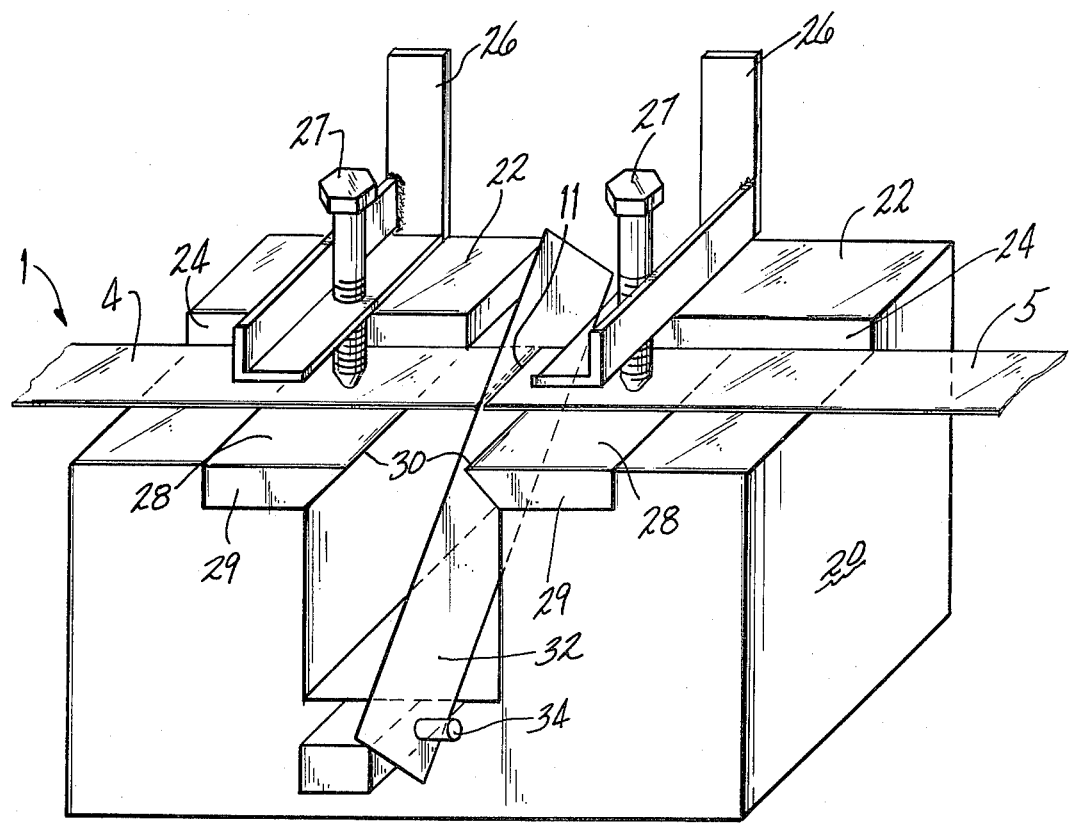
FIG-3

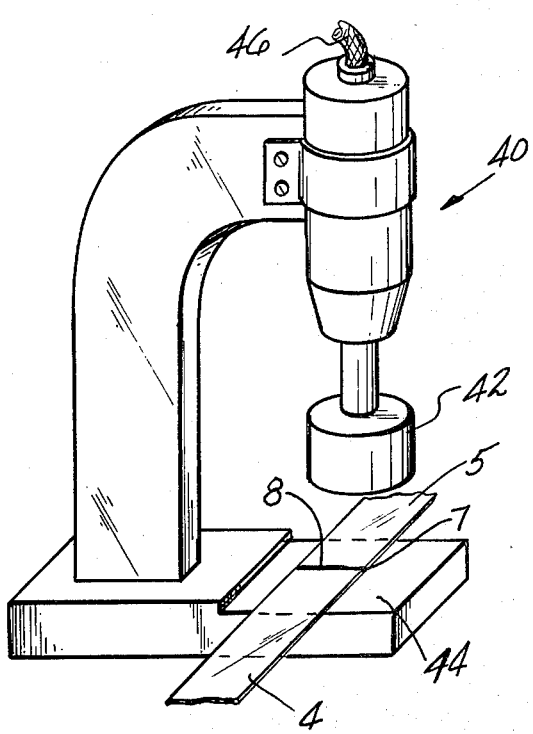
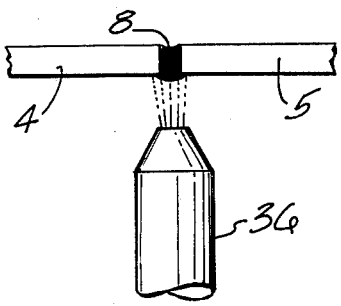
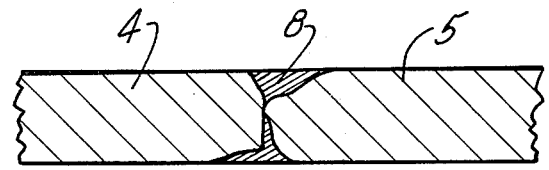
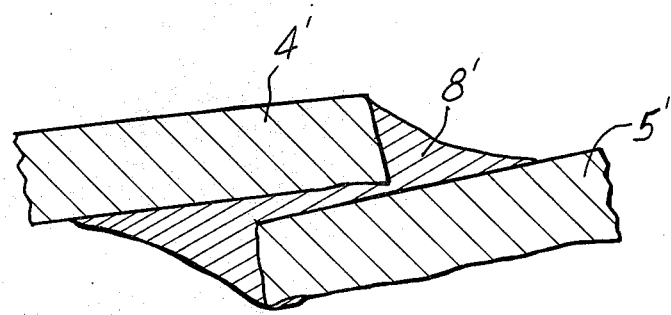
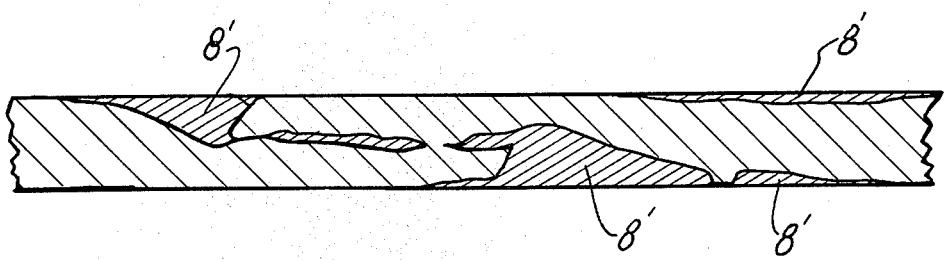
FIG-5
FIG-4
FIG-6
FIG-7A
FIG-7B

PROCESS FOR JOINING NARROW WIDTH THIN GAGE METAL OR ALLOY STRIP

BACKGROUND OF THE INVENTION

Numerous industrial mass production processes utilize long coils of narrow width thin gage metal or alloy strip material. For example, long coils of narrow width thin gage copper alloy strip material frequently find use in the electronics industry in continuous mass production of contacts and in continuous formation of connectors from moving strip material. It is frequently required, therefore, to provide long lengths of strip material of uniform geometry which are adapted to readily pass through mass production forming, stamping and assembling machinery.

In order to form such long coils of metal or alloy narrow width thin gage strip material, it is necessary to join a succession of lengths of strip material end to end and to subsequently wind the continuously-joined strip material onto a large spool or storage reel. While the desire to quickly, efficiently and economically carry out such joining is apparent, it nevertheless is essential that the joints between strip segments be uniform with the remainder of the strip material so that the stamping or other mass production machinery utilized in forming contacts and other products can operate without interruption and/or jamming due to cross-sectional variations in strip cross section.

While the welding of thick strips, that is strips greater than about 0.012 in. gage, poses no particularly excessive problems, the welding of narrow width thin gage strip, that is strips less than about 0.012 in. gage, poses several particularly troublesome problems. These problems include burn-through of the strip material while welding, explosion of the strip material, alignment and overlap problems associated with the holding and heating of the narrow width thin strip material, and the need for expensive welding equipment and/or welders possessing a high order of skill for operating the equipment and carrying out the welding processes.

Accordingly, it is the principal object of the present invention to provide a process and means for rapidly, simply, and efficiently joining a multiplicity of lengths of narrow width thin gage strips end to end to form a substantial continuous strip.

It is still a further object of the present invention to provide a process for rapidly and efficiently joining a multiplicity of lengths of narrow width thin gage strips end to end to form a substantial continuous strip which process may be carried out by an inexperienced operator with a minimum of training.

It is still a further object of the present invention to provide a process for forming a continuous strip from a plurality of narrow width thin gage strips which eliminates the need for the use of expensive and/or complex apparatus in carrying out the joining process.

Finally, it is yet a further object of the present invention to provide a process and means for rapidly, simply, and efficiently joining a multiplicity of lengths of narrow width thin gage strips into a continuous strip whereby, although the joints between the lengths of strip material comprise or include a different material than the strip segments, the joints are of the same gage and geometry of the continuous strip elements, and are strong enough not to break when placed on a TWR (transverse winding reel).

Further objects and advantages will appear hereinbelow.

PRIOR ART STATEMENT

It is known to form a continuous coil from thick gage strip, i.e. strip formed from materials greater than about 0.012 in gage, by resistance butt welding a series of relatively short length coils of strip and traverse winding these onto a large spool. This butt welding process is time-consuming and has frequently to be repeated to obtain a single joint. Adhesion is often marginal, and application of tension and/or flexure to these joints often causes failure.

In thinner gage materials, that is strip material less than about 0.012 in., resistance butt welding is generally not useful since the application of welding current can cause arcing and expulsion of molten metal and/or will, because of the inability of the heated metal to support its own weight, lead to folded or excessively overlapped joints. The latter conditions are undesirable since in most cases the joined coils are often required to pass between dies whose clearance is typically such that metal passing through the die cannot vary by more than ±0.0005 in.

TIG welding has been used to successfully join narrow width thin gage materials, but the capital outlay for this type of equipment is high. An even greater problem and limitation with this type of welding is that a relatively high order of skill is required to achieve successful joints.

U.S. Pat. No. 3,421,676 to Jenkins et al. discloses a process for joining thin metal sheets wherein end portions of the sheets are cut, cleaned and held in butting relation. After butting the sheets together, the joint is sprayed with hot molten metal particles which are allowed to cool and solidify after which the joint is heated to provide a fused joint. The joining of the sheets is followed by a compressing or planishing operation, preferably by planishing roll means. Such a process when utilized for the joining of narrow width thin gage metal strips suffers from several drawbacks. When thin sheets are placed in butting relation, they expand upon being heated, thereby causing foldover of the joint or severe overlap at the joint. When it is attempted to overcome such an overlap or foldover by compressing, severe metal flow causes doglegging of the strip and requires excessive effort and time to overcome. In addition, spraying of molten metal particles along the joint leads to an overlap of material and high points across the area of the strips bridging the joint which again requires excessive and time-consuming work to remove or reform in order to get the joint to the same geometry of the strips. Finally, compression by planishing rolls tends to cause local inhomogeneity of deformation which can result in "oil can" effects and doglegging of the joined strip.

The establishing of a predetermined gap between strip ends prior to welding is shown in U.S. Pat. Nos. 3,403,833 to Wheeler et al. 3,771,215 to Williams et al. The '833 patent discloses a complex strip clamp assembly which is utilized to establish a predetermined spacing between trimmed ends of two strips to be joined. The '215 patent utilizes an indexing means in conjunction with a gauge bar located at a welding station, the gauge bar and indexing means serving to establish a predetermined gap between the ends of the strips to be joined in the welding station. Both these patents disclose complex and expensive spacing and welding apparatuses, the need of which it is the purpose of the present invention to obviate. In addition, neither patent is directed specifically to the joining of narrow width thin gage strips, which as stated hereinabove, are not economically and readily susceptible to welding operations.

The *Metals Handbook,* Volume 6 (Welding and Brazing), 8th Edition, describes in part the cost benefits of manual torch brazing of parts and establishes typical joint clearances for use with filler metals commonly employed in joining copper and copper alloys. While such clearances might be of importance in the joining of certain metal parts, no consideration has been given to coefficients of expansion and consequent joint overlap or curling in the joining of strips in end to end relation. Moreover, clearances which relate to the filler metal utilized do not recognize considerations and problems which relate to the joining of narrow width thin gage strip material.

U.S. Pat. Nos. 2,761,208 to Mitchell and 3,110,101 to Keiffer et al. disclose reducing welded joints between joined strips by mechanical processing. The '208 patent teaches cold working an overlapped-welded joint, preferably by drawing the joined strip through finishing dies, while the '101 patent teaches high frequency hammering of the welded junction between two strips consisting of a metal selected from the group consisting of molybdenum, tungsten and alloys thereof. Neither of these two patents solve any of the problems enumerated in the background section hereinabove, and deal with a treatment of joints which effects excessive metal deformation unsuitable for reduction of joints in narrow width thin gage strip products.

The present invention overcomes the deficiencies described above and provides an efficient, speedy, and economical process for joining narrow width thin gage metal or alloy strips which can be carried out without the need for expensive apparatus and/or highly skilled operators.

SUMMARY OF THE INVENTION

The process of this invention is unique in that butt joining of narrow width thin gage strip material is accomplished via a brazing process which enables quick, efficient, and inexpensive joining of the strip material into a continuous coil of geometrically uniform narrow width thin gage strip material.

In practicing the instant joining process, metal buildup at joints is minimal, and joint strength has been found to be approximately 80% that of the annealed parent metal strips. Because of the heating required to braze the joint, softening of the strip occurs on either side of the brazed joint and thus in flexing, the bending forces are not concentrated at the brazed junction. In a further aspect of the present invention, any excess braze metal present at the joint can be readily reduced to the parent gage of the strip by a specific hammering operation which takes into account the fact that the braze metal is typically softer than the parent metal.

In accordance with the present invention, cooperating end portions of two narrow width thin gage strip segments are cut, aligned and held together with a predetermined gap therebetween, and joined by a brazing operation forming a joint therebetween. The brazed joint is subsequently reduced so as to have substantially the same geometric cross section as the parent metal strip segments.

BRIEF DESCRIPTION OF THE DRAWINGS

FIGS. 1(*a*) and 1(*b*) are partial top and side views, respectively, showing a finished brazed joint between two narrow width thin gage strips joined together in accordance with the process of this invention.

FIG. 2 is a partial perspective view of a guillotine-type cutter adapted to carry out a strip cutting step in accordance with this invention.

FIG. 3 is a perspective view of a brazing fixture adapted to carry out multiple strip segment gaging, holding, and aligning steps in accordance with the process of the present invention.

FIG. 4 is a partial side view illustrating another step in the process of the present invention wherein a torch is shown melting braze material placed in the joint between two narrow width thin gage strips.

FIG. 5 is a perspective view of a hammering device utilized in hammering the joint area of two narrow width thin gage strips to gage in accordance with another aspect of the present invention.

FIG. 6 is a partial view in section of a completed joint produced in accordance with the process of the present invention.

FIGS. 7(*a*) and 7(*b*) are partial views, respectively, in section of an undesirable brazed and hammered joint formed when brazing of the joint is carried out on excessively overlapped narrow width thin gage strip ends, and excessive hammering of the joint is required to reduce the joint to parent metal or alloy gage.

DETAILED DESCRIPTION OF PREFERRED EMBODIMENT

While various features of this invention are described herein as being adaptable for joining of copper and copper alloy narrow width thin gage strips, it is to be understood that the various features of this invention can be utilized singly or in any combination thereof to join other metal and alloy strip elements as desired.

FIGS. 1(*a*) and 1(*b*) are top and bottom views showing portions of a continuous narrow width thin gage strip 1 made up in part of strip segments 4 and 5. The strip segments 4 and 5 are joined together at a joint 7 via a brazing material 8. The joint 7 is shown to be of the same geometrical cross section as that of the parent metal of strip segments 4 and 5. It is, of course, to be understood that any number of strip segments may be joined end to end to make up a continuous strip 1 of any desired length.

The term narrow width thin gage strip is used herein to include any metal or alloy strip material which has a width of about 3 in. or less and a thickness of about 0.012 in. or less.

In one aspect of the present invention, the strip segments 4 and 5 have their respective ends 10 carefully cut or trimmed so as to insure that the cut ends 11 (shown as dotted lines in FIG. 2) will match on subsequent brazing. FIG. 2 depicts one suitable apparatus for carrying out the strip segment end preparation in accordance with the brazing process of the present invention. In FIG. 2, strip segments 4 and 5 are aligned on base elements 12. To facilitate lateral alignment of the strip segments 4 and 5, base elements 12 are provided with vertical guide walls 13. When an operator has placed the strip elements 4 and 5 upon base elements 12 in abutting relationship with guide walls 13, he need merely activate guillotine cutter 15 to shear off respective ends 10 and thereby assure that the now cut ends 11 of strip segments 4 and 5 match on subsequent brazing.

After providing cut ends 11 on strip segments 4 and 5, the segments are aligned in abutting relationship with a predetermined gap therebetween for subsequent brazing of the joint 7. FIG. 3 depicts a brazing fixture 20 particularly suitable for alignment and securing of the strip segments 4 and 5 for subsequent brazing operations. Brazing fixture 20 is shown provided with alignment steps 22 having machined faces 24 for providing alignment of the edges of strip segments 4 and 5. Also secured to or forming part of the brazing fixture is a pair of clamps 26. Clamps 26 are utilized to hold strip segments 4 and 5 via clamping screws 27 down on the upper surface 28 of anvils 29. The anvils 29 are machined so that the upper surfaces 28 thereof provide effective alignment of the strip segments 4 and 5 in a single plane at least in the area of the joint to be brazed.

Also mounted to the body of brazing fixture 20 is a movable feeler gage 32. Feeler gage 32 is shown between the cut ends 11 of strip segments 4 and 5 which abut flush therewith, and is adapted via shaft 34 to be rotated out of the joint area during actual brazing operations.

Various modifications could, of course, be made to holding fixture 20. For example, flat platens could be provided at the tip of clamping screws 27 so as to prevent damage to secured strip segments 4 and 5. Moreover, any of a variety of clamping devices could be used, as for example spring activated, single action, and other types of clamps.

While anvils 29 might be constructed of various materials such as for example transite, anvils constructed of a fired ceramic material such as "Lava" manufactured by 3M Company have been found to be more suitable for use in conjunction with the process of the present invention, exhibiting excellent wear characteristics while simultaneously functioning to limit the heat transferred from the brazing zone.

A gap of approximately 9/16 in. between the anvil edges 30 has been found to be quite suitable, being small enough to provide sufficient support for the overhanging end portion of the strip segments 4 and 5 while at the same time being wide enough to permit the carrying out of the gap setting and brazing steps of the present invention.

FIG. 4 shows the use of a torch 36 to apply heat to a brazing paste or material 8 located in the joint between the two strip segments 4 and 5. It has been found that for some alloys and gages, such as 0.008 in. gage copper alloy C26000 strip, a simple hand-held propane torch with a wide cone tip was adequate to carry out brazing. However, an air-acetylene or similar hotter flame might be more versatile if a variety of metal alloys and gages are to be joined. Strip widths of about 1 in. or less are preferred when utilizing hand-held propane torches since it becomes more difficult to apply uniform heat across the width of the strip segments as the width increases.

Referring now to FIG. 5, there is depicted therein a vertically-mounted pneumatic hammer 40 provided with a striker head 42 specifically designed to uniformly reduce the joint 7 with minimal distortion of the adjacent strip areas. The striker head 42 and anvil 44 present flat faces to the strip so reduction becomes self-limiting as base metal gage is approached. Pneumatic hammer 40 is connected to a source of high pressure air (not shown) via inlet 46.

Excessive hammering and metal flow when reducing a brazed and dressed joint to parent metal gage will often result in metal cracking, doglegging, excessive work hardening, and "oil can" effects. Thus, excessive hammering and the use of opposed convex hammer/anvil faces in reducing brazed joints in narrow width thin gage strip is highly undesirable. It has been found in accordance with another aspect of the present invention that by establishing the diameter of striker head 42 to be approximately twice the width of the metal strip and by controlling the hammer pressure in accordance with the properties of the strip material a self-shimming effect takes place upon hammering of the joint.

Upon brazing, the areas of the strip segments adjacent the joint are subjected to a moderate anneal, and both these areas and the joint are softer than the parent metal of the remainder of the strips. When hammering is carried out for short periods of time at pressures lower than would deform the parent metal of the strip segments and striker head 42 extends to the parent metal areas, excessive work hardening and metal flow is avoided and a self-shimming effect takes place—with the parent metal of the strip segments acting as a shim.

It should be apparent that striker head 42 need not be of a round configuration, the only requirements being that the face thereof be flat and of a longitudinal dimension or extent approximately twice the strip width. The aforementioned striker head geometry and size relationship has been found to eliminate most of the inhomogeneity of deformation which often resulted in "oil can" effects.

Another important aspect of the present invention lies in the establishing of an appropriate gap between the cut ends 11 of strip segments 4 and 5 prior to brazing of the joint. During heating of the braze material the metal or alloy strip segments being joined will expand. If the gap between the strip segment ends is too great, brazing becomes quite difficult and excessive amounts of braze material would be required. If the gap is too small, excessive overlap of the strips occurs, requiring excessive reduction operations which cause doglegging and "oil can" effects in the metal or alloy strip as discussed hereinabove. These problems are particularly severe in joining of narrow width thin gage strip material since it is intended to carry out the brazing operation as quickly, inexpensively, and efficiently as possible. When using a hand-operated torch on thin gage strip, excessive heating would occur rapidly where a wide gap exists, and difficulty in completing an effective joint would occur. Excessive reduction problems would exist where too narrow a gap and resultant overlap of strip segment ends exist.

Since it is not precise as to just exactly what amount of heat will be applied to just what total area and for how long, it is necessary to approximate by calculation a gap size which for a particular metal or alloy strip will be most likely to result in successful joints. A sample calculation in accordance with the present invention for copper alloy C26000 follows:

(1) The coefficient of thermal expansion $\alpha$ for alloy C26000 is about $2 \times 10^{-5}/°C$.

(2) Utilizing the equation $$l_t = l_o(1 + \alpha T),$$

where
$l_t$ is length at final temperature in cm;
$l_o$ is original length in cm;

T is final temperature, °C.

(3) Assuming that the heated area of the strip segments adjacent the joint to be approximately 1.5 cm (9/16 in.) and that the temperature within this region to exceed the melting point of braze metal, typically 600°–650° C. by approximately 100° C. Therefore, the average final temperature can be taken as about 700° C. Hence:

$l_t$ = unknown
$l_o$ = 1.5 cm
T = 700° C.

Using the equation above,
$l_t = 1.5(1 + 2 \times 10^{-5}(700° \text{ C.}))$
$l_t = 1.52$, and
$l_t - l_o = 0.02$ cm or 0.2 mm = desired gap FIG. 6 depicts a joint wherein upon the setting of a gap in accordance with the above calculation the cut ends of strip segments 4 and 5 just "kiss" after brazing and reduction. This is the ideal joint inasmuch as a minimum amount of brazing material 8 is required for joining and excessive metal removal or deformation to reduce the joint to parent metal gage is unnecessary. FIGS. 7(a) and 7(b) on the other hand depict a resulting joint where no gap or an insufficient gap between strip segments 4' and 5' was provided. As can be seen from FIG. 7(a), excessive amounts of braze material were required to fill the interspace between the strip segments 4' and 5' rendering the brazing process more difficult and expensive. Moreover, as can be readily seen from FIG. 7(b) excessive metal and braze material flow has resulted from the reduction operation carried out to reduce the joint to parent metal gage. This excessive hammering typically results in unacceptable product processing, poor strip edge geometry, dog legs, splits, etc.

Having thus described the various aspects of and means which could be utilized to carry out the process of the present invention, such a process will be described for joining a particular strip material:

(1) Assuming the two strip segments to be joined to be ¾ in. × 0.008 in. copper alloy C26000, a desired gap of 0.02 cm is established in accordance with the hereinabove calculation.

(2) Each strip segment is placed in the cutting device depicted in FIG. 2. This involves placing each strip against guide walls 13 and flat on the upper surface of base elements 12 so that ends 10 project into the cutting zone of guillotine cutter 15. The strip segments 4 and 5 are cut by lowering cutter 15 to produce matched cut ends 11.

(3) A 0.02 cm feeler gage (32) is selected and placed on shaft 34 of brazing fixture 20 and rotated midway into the gap between edges 30 of anvils 29.

(4) One strip segment is clamped in fixture 20 (FIG. 3) on one side of feeler gage 32 using surface 28 of anvil 29 and machined faces 24 of alignment steps 22. The end of this strip should abut flush against feeler gage 32. Similarly, the second strip segment is clamped into place on the other side of and butting against feeler gage 32. Clamping is carried out by rotating screws 27 till they secure the strip segments against surface 28 of anvil 29.

(5) Feeler gage 32 is then rotated out of the joint area between the two butting strip segments.

(6) A strip of brazing paste is applied across the gap between strip segment cut ends 11 being sure to get material into the gap using a minimum of paste. (One preferred way of applying brazing paste in such a joint would be with the use of a syringe which results in a somewhat precise amount of paste being laid into the gap between the butted strip ends without the need for skilled labor or expensive devices.)

(7) Flame from a torch (preferably hand-held) is applied from the underside of the butting strip segments. The flame is played along the joint or braze line only long enough to assure complete melting of the braze material.

(8) The joined strip material is unclamped and flux from the brazed joint is wiped off. The joint is inspected for complete attachment. If incomplete joining has occurred, the strip may be reclamped after which a small amount of brazing paste can be applied to the open area and gently torched till melted. If the joint is bad, the entire section can be cut out and the process repeated.

(9) Both sides of the joint are dressed with a flat file paying attention to remove only excess braze. To facilitate dressing, the joined coil section can be clamped to any suitable dressing fixture. This operation serves to minimize the hammering needed to achieve parent metal thickness at the joint area.

(10) Hammer the joint area to gage by placing the strip joint on anvil 44 and activating hammer 40 with a foot pedal or the like (not shown) while at the same time moving the joint back and forth under striker head 42. Movement should be in the longitudinal direction of the coil, and hammering should preferably be carried out for a duration in the range of about 5–10 seconds. In hammering narrow width thin gage copper alloy strips, hammer air pressures in the range of about 20–40 psi have been found to be satisfactory. Any increase or slight widening of the strip at the joint location can easily be eliminated by edge filing of the joined strip.

Various means and methods can, of course, be utilized to carry out the various steps of the aforementioned process of brazing strip segments end to end. For example, instead of placing a braze paste in the joint between the strip segments it would be possible to paint the strip segment ends with a suitable flux and then heat to brazing temperature. Upon attaining brazing temperature, a thin wire of brazing alloy can be touched to the joint in order to accomplish joining of the two strip segments. This particular method of applying braze material provides for very good control of the actual amount of braze material applied to the joint and helps to avoid the need for excessive hammering or metal reduction of the brazed joint.

In accordance with the concepts of the present invention, pairs of brass strip 0.008 in. gage by ½ in. wide were placed end to end in a clamping fixture with a separation between the strips governed as disclosed herein by the linear coefficient of expansion of brass. Both ends of the strip segments were painted with a fluxing agent and heated with an oxy-acetylene torch. Upon attaining a suitable temperature, a thin wire of brazing alloy was touched to the joint in order to accomplish joining of the strip segments. Tensile properties of a group of such brazed joints using several brazing alloy types are shown in Table I and compared with the tensile strength of the parent metal strip in both the asrolled and the annealed conditions.

TABLE I
TENSILE PROPERTIES OF BUTT BRAZED 0.008" GAGE ALLOY 260 BRASS STRIP

| Sample | 0.2% Yield Strength (ksi) | Ultimate Tensile Strength (ksi) | Elongation in 2" (Pct.) | Notes |
|---|---|---|---|---|
| A | 24 | 48 | 6 | Cu—Sn—P braze metal |
| B | 21 | 44 | 6 | Cu—Sn—P braze metal |
| C | 23 | 49 | 7 | Cu—Sn—P braze metal |
| D | 20 | 30 | 9 | Ag-13 Cd—Cu—Zn braze metal |
| E | 22 | 33 | 7 | Ag—Cd—Cu—Zn braze metal |
| F | 24 | 37 | 4 | Ag—Cu—P braze metal |
| Alloy 260 extra spring | 103 | 109 | 2 | Parent metal for above samples |
| Alloy 260 annealed | 22 | 45 | 40 | Typical values |

Several additional brazed joints were made in accordance with the process utilized in production of the samples in Table I with the difference that the brazed joints were purposefully made using excess braze metal and then hammered in order to reduce the joint thickness to that of the parent metal strip. Tensile properties of these additional samples are shown in Table II.

TABLE II
TENSILE PROPERTIES OF BUTT BRAZED AND HAMMERED TO GAGE 0.008" ALLOY 260 BRASS STRIP

| Sample | 0.2% Yield Strength (ksi) | Ultimate Tensile Strength (ksi) | Elongation in 2" (Pct.) | Notes |
|---|---|---|---|---|
| G | 27 | 52 | 9 | Cu—Sn—P braze metal |
| H | 32 | 54 | 8 | Cu—Sn—P braze metal |
| I | 29 | 53 | 6 | Cu—Sn—P braze metal |
| J | 47 | 55 | 8 | Ag—Cd—Cu—Zn braze metal |
| K | — | 40 | 2.5 | Ag—Cu—P braze metal |

It is apparent that there has been provided with this invention a novel process for economical, efficient, and fast joining of narrow width thin gage strip segments which fully satisfy the objects, means, and advantages set forth herein before. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for joining the trailing end of a first narrow width thin gage metal or alloy strip segment to the leading end of a second narrow width thin gage metal or alloy strip segment, said first and second strip segments being of approximately the same gage, and being of a width of about 3 in. or less and a gage of about 0.012 in. or less, comprising:
   cutting off at least a portion of said leading and trailing ends to produce a trailing edge on said first strip segment and a leading edge on said second strip segment;
   aligning said first and second strip segments so that said leading and trailing edges and at least a portion of said leading and trailing ends adjacent said leading and trailing edges are in a single plane, said leading and trailing edges matching in abutting relation and defining a joint therebetween;
   applying a braze material to said joint;
   applying heat to said joint so as to melt said braze material and join said first strip segment to said second strip segment; and
   simultaneously hammering said joint and at least a portion of said leading and trailing ends for a time and at a pressure such that portions of the parent metal or alloy of said first and second strip segments act as a shim; whereby said joint is reduced to approximately the same geometrical cross section as that of the parent metal or alloy of said first and second strip segments with a minimum of metal flow and deformation at said joint and said leading and trailing ends.

2. The process according to claim 1 wherein said step of hammering is carried out by actuating a hammer having a flat striker surface whose longitudinal extent along said first and second narrow width thin gage metal or alloy strip segments is at least approximately twice the width of said first and second strip segments.

3. The process according to claim 2 wherein said first and second narrow width thin gage metal or alloy strip segments comprise a copper alloy material of a width of about 1 in. or less, and wherein said time is of about 5 to 10 seconds duration and said pressure is in the range of about 20–40 psi.

4. The process according to claim 1 including the step of removing excess braze material at said joint by dressing at least one side of said joint with a flat file after said step of applying heat and prior to said step of hammering.

5. The process according to claim 1 including predetermining a gap value between said leading and trailing edges such that upon brazing of said first strip segment to said second strip segment overlap of said trailing end and said leading end is substantially absent; and securing said first and second strip segments during said aligning step so as to maintain the distance between said joint defining leading and trailing edges equal to said predetermined value.

6. A process for brazing the trailing end of a first narrow width thin gage metal or alloy strip segment to the leading end of a second narrow width thin gage metal or alloy strip segment, said first and second strip segments being of approximately the same gage and being of a width of about 3 in. or less and a gate of about 0.012 in. or less, comprising:
   cutting off at least a portion of said leading and trailing ends to produce a trailing edge on said first strip segment and a leading edge on said second strip segment;
   aligning said first and second strip segments so that said leading and trailing edges and at least a portion of said leading and trailing ends adjacent said leading and trailing edges are in the same plane, said leading and trailing edges matching in abutting relation and defining a joint therebetween;
   predetermining a gap value between said leading and trailing edges such that upon brazing of said first strip segment to said second strip segment overlap of said trailing end and said leading end is substantially absent;

securing said first and second strip segments during said aligning step so as to maintain the distance between said joint defining leading and trailing edges equal to said predetermined value;

applying a braze material to said joint; and applying heat to said joint so as to melt said braze material and join said first strip segment to said second strip segment.

7. The process according to claim 5 or 6 wherein said step of predetermining a gap value is carried out according to the formula $$\text{gap value} = l_t - l_o$$

where $l_t$ is the strip length at final temperature T and is determined according to the formula $$l_t = l_o(1 + \alpha T)$$

$l_o$ is the original strip length, and $\alpha$ is the coefficient of thermal expansion of the strip segments.

* * * * *

UNITED STATES PATENT AND TRADEMARK OFFICE
CERTIFICATE OF CORRECTION

PATENT NO. : 4,286,744

DATED : September 1, 1981

INVENTOR(S) : Damian V. Gullotti, Lloyd E. Damon, Phillip A. Chatfield, and Joseph Winter It is certified that error appears in the above-identified patent and that said Letters Patent is hereby corrected as shown below:

In column 2, line 7, "in" should read —in.—;

In column 2, line 32, "for" should read —of—;

In column 2, line 59, the word —and— should be inserted after "Wheeler et al."

In column 3, line 21, "Keiffer et al." should read —Kieffer et al.—

In column 8, line 67, "asrolled" should read —as-rolled—.

In column 9, TABLE I, in the line beginning "D", in the fourth column under "Notes", "Ag-13 Cd—Cu—Zn" should read —Ag—Cd—Cu—Zn—.

In column 10, line 52, "gate" should read —gage—.

Signed and Sealed this

Ninth Day of November 1982

[SEAL]

Attest:

GERALD J. MOSSINGHOFF

Attesting Officer     Commissioner of Patents and Trademarks